(12) United States Patent
Cherfane

(10) Patent No.: US 6,289,649 B1
(45) Date of Patent: Sep. 18, 2001

(54) FOAM DIVERTER ASSEMBLY FOR USE IN PRODUCING FOAM CUSHIONS

(75) Inventor: Raymond Cherfane, Acworth, GA (US)

(73) Assignee: Sealed Air Corporation(US), Saddle Brook, NJ (US)

( * ) Notice: Subject to any disclaimer, the term of this patent is extended or adjusted under 35 U.S.C. 154(b) by 0 days.

(21) Appl. No.: 09/174,383

(22) Filed: Oct. 16, 1998

(51) Int. Cl.$^7$ .................................................. B65B 61/20
(52) U.S. Cl. ........................... 53/284.7; 53/139.5; 53/472
(58) Field of Search .................. 53/139.5, 284.7, 53/155, 568, 472; 141/286; 239/461, 518, 521

(56) References Cited

U.S. PATENT DOCUMENTS

| | | |
|---|---|---|
| 3,302,891 | 2/1967 | Faro et al. .......................... 239/407 |
| 4,071,195 * | 1/1978 | Kuhns et al. ....................... 239/289 |
| 4,377,251 | 3/1983 | Yeish ................................. 239/419.3 |
| 4,568,003 | 2/1986 | Sperry et al. ...................... 222/145 |
| 4,674,268 | 6/1987 | Gavronsky et al. ................ 53/468 |
| 4,800,708 | 1/1989 | Sperry .................................. 53/449 |
| 4,854,109 | 8/1989 | Pinarer et al. ...................... 53/397 |
| 4,938,007 * | 7/1990 | Sperry .................................. 53/449 |
| 4,999,975 | 3/1991 | Willden et al. ..................... 53/451 |
| 5,027,583 * | 7/1991 | Chelak ................................. 53/451 |
| 5,149,065 | 9/1992 | Wilden et al. ..................... 267/136 |
| 5,186,905 | 2/1993 | Berram et al. ..................... 422/133 |
| 5,335,483 * | 8/1994 | Gavronsky et al. ................ 53/451 |
| 5,376,219 * | 12/1994 | Sperry et al. ...................... 156/515 |
| 5,660,662 * | 8/1997 | Testone ............................. 156/145 |
| 5,727,370 | 3/1998 | Sperry ................................. 53/472 |
| 5,776,510 * | 7/1998 | Reichental et al. ................ 425/112 |

* cited by examiner

Primary Examiner—Allen Ostrager
Assistant Examiner—William Hong
(74) Attorney, Agent, or Firm—Thomas C. Lagaly

(57) ABSTRACT

A protective foam cushion-making apparatus dispenses reactive foam components into an interior space between two panels of plastic film to form protective foam cushions. The apparatus includes a supply of plastic film and a film driving assembly. A foam component dispensing assembly is interposed between the film panels and injects two reactive foam components into the interior space where they are mixed together to form a mass of expandable foam. The plastic film forms a flexible mixing chamber in the area between the two pliable rollers in which the reactive foam components are mixed together after they are dispensed from the foam dispensing assembly. The foam component dispensing assembly includes two foam component dispensing tubes that are oriented at an angle to each other. One of the dispensing tubes includes a diverter assembly attached to it that provides a reaction surface that directs the flow of one foam component into the flow of the other foam component.

12 Claims, 4 Drawing Sheets

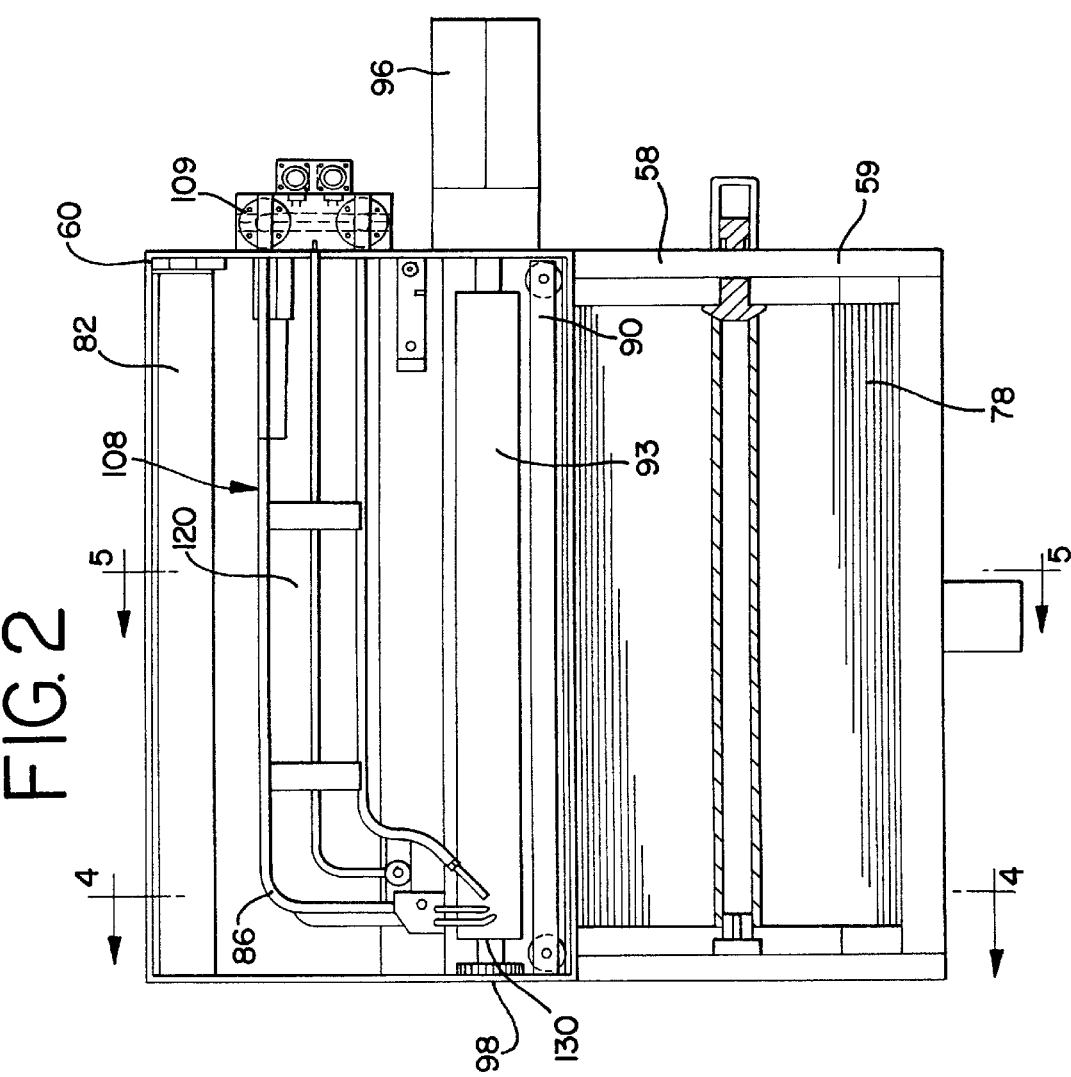
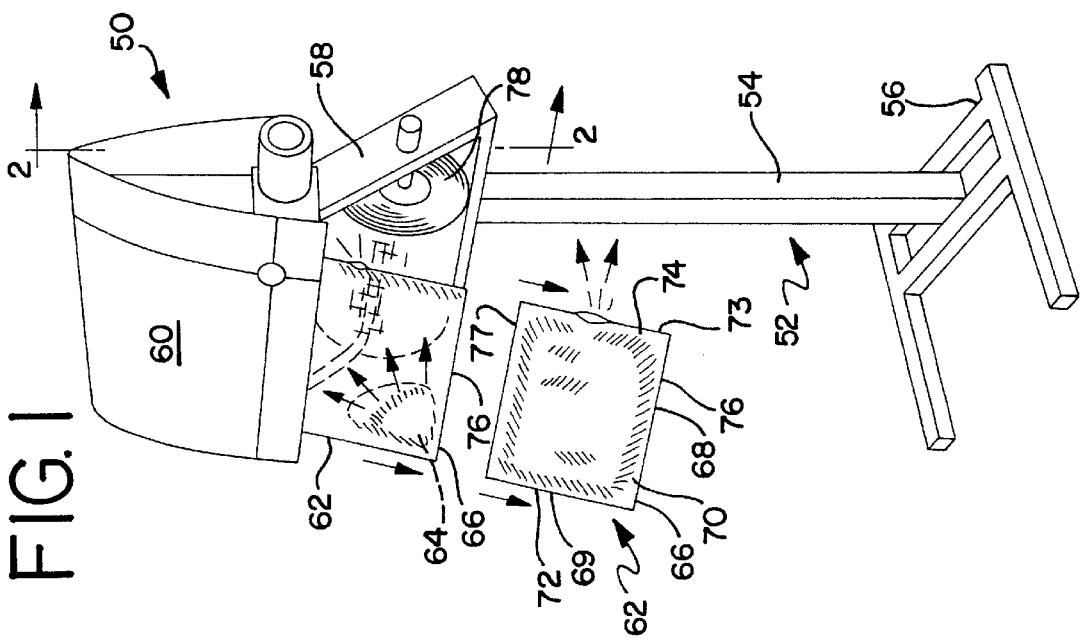

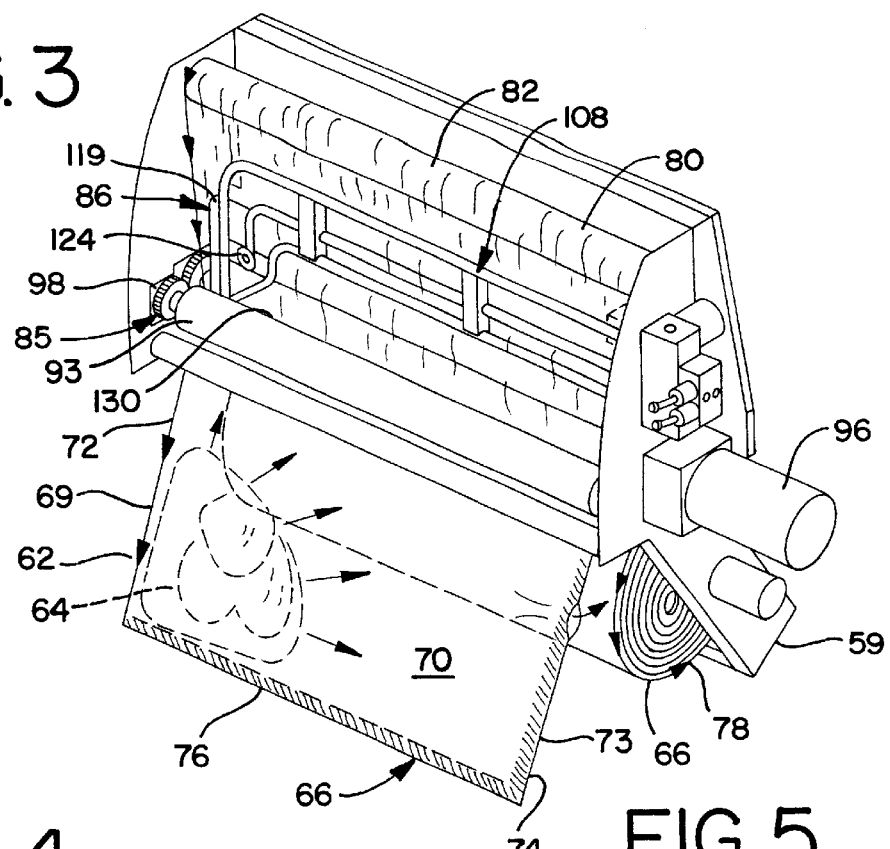
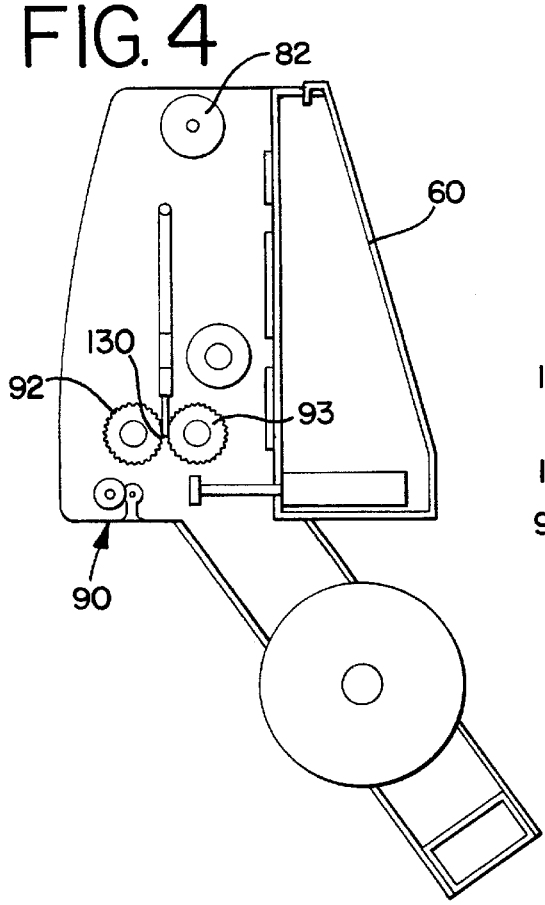
FIG. 3
FIG. 4
FIG. 5

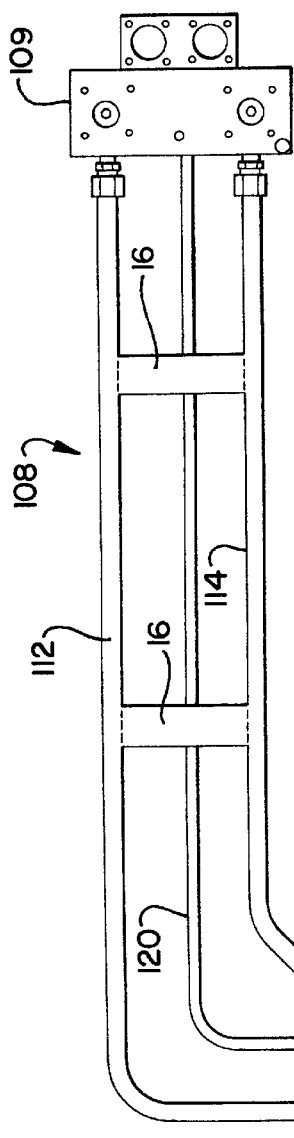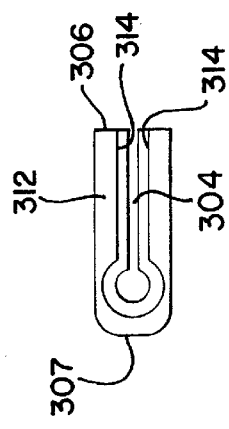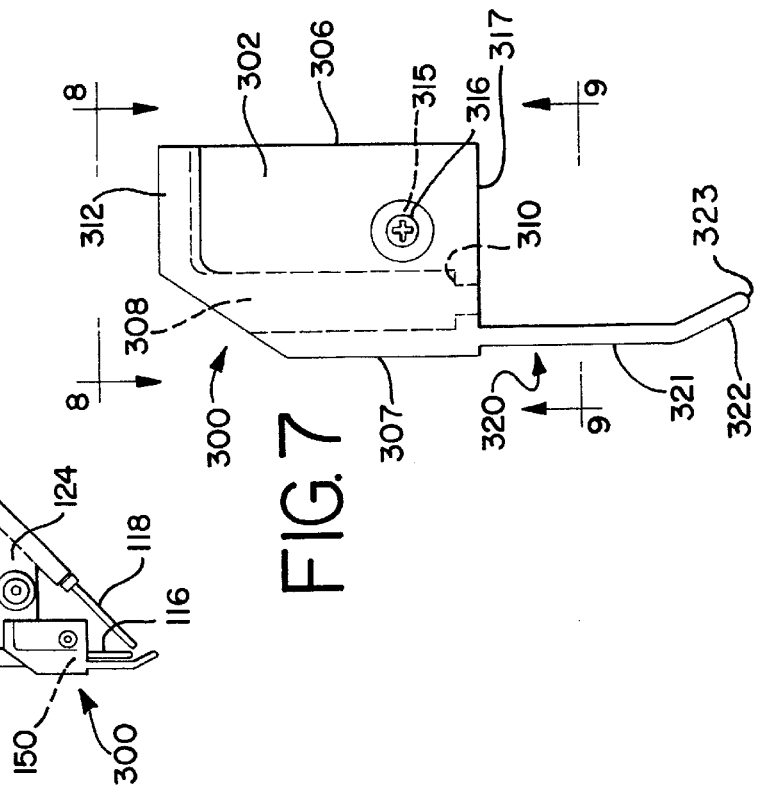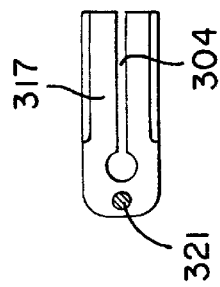

FOAM DIVERTER ASSEMBLY FOR USE IN PRODUCING FOAM CUSHIONS

BACKGROUND OF THE INVENTION

The present invention relates generally to apparatus and methods for forming individual foam-filled bags commonly used as protective cushions in the packaging arts. More particularly, the present invention relates to an improved device and an apparatus for forming such protective cushions by dispensing two streams of reactive foam components between opposing panels of a flexible sheet material and diverting, or deflecting, one of the two reactive foam component streams into the path of the other of the two streams to more fully promote mixing of the reactive foam components together therebetween in order to produce an expandable foam between the panels.

In the packaging industry, expandable foams have been used for some time to form protection for packaged articles. Conventional practice in such industry has included filling a cardboard box with an expandable foam, such as a urethane or polyurethane foam, and contacting the foam with a plastic barrier sheet to create a protective cushion and then placing an article for shipping into the box on the cushion. The article may then also be covered with another plastic sheet and a second filling of expandable foam accomplished before closing the box.

Another practice in the industry utilizes foam cushions which are inserted into the packing box immediately after the foam cushions are made. This is accomplished by machines which react two foam components together within a gun apparatus and then dispense the foam so formed between two opposing plastic sheets, and then seal the edges to form a protective foam cushion. Numerous patents exist which describe such methods and apparatus. Two such patents, U.S. Pat. No. 4,999,975, issued Mar. 19, 1991 and U.S. Pat. No. 4,800,708, issued Jan. 31, 1989 describe apparatus for foam cushion making in which a foam dispenser, or gun, is positioned between two opposing plastic panels. Two different reactive foam components, commonly referred to as foams precursors, are mixed together in the foam gun in order to form the foam, which is then dispensed under pressure between the two opposing plastic panels to form the foam protective cushions.

Although such apparatus and methods are operational and produce protective foam cushions which adequately provide protection to packaged articles, they are not without certain inherent disadvantages. For example, they reply upon a mixing chamber or cartridge in the foam gun to provide an area where the two foam components are mixed together to form the expandable foam. Once formed, the foam is then dispensed under pressure through a nozzle downstream of the mixing chamber. The mixing chamber typically accumulates bits of hardened foam over time and thus must be cleaned at regular intervals, typically at weekly intervals often by flushing the system with a solvent. At this time, the apparatus may have to be taken apart to be cleaned, thereby leading to detrimental downtime of the apparatus.

Other apparatus rely upon a complex foam dispensing gun structure which utilizes two ports to convey the two reactive foam components to a mixing chamber preceding the dispensing end of the gun. In this type apparatus, the mixing chamber may include a valving rod which slides in and out of the mixing chamber to control the flow of at least one of the reactive foam components. This type of apparatus is also not without certain disadvantages, for although the valving rod effectively acts as a valve to control the flow of the reactive foam components into the mixing chamber, the foam formed by the reactive components has been known to slowly build up in the mixing chamber and on the valving rod itself. Additionally, when a valving rod is used, "crossover" between the foam components may occur when one of the foam components accumulates on the valving rod and makes contact with into the other foam component as the valving rod slides back and forth to form a reacted, hardened foam. The valving rod then must be cleaned, which typically requires scraping the accumulated foam off of the valving rod or flushing the system with a solvent. Each cleaning wears down the tolerance of the rod to eventually wear down the overall effectiveness of the foam dispensing gun of these devices.

In order to prevent the buildup of reacted foam in the mixing chamber and dispensing nozzles of the aforementioned apparatus, solvent systems have been developed that continuously dispense solvents through the foam dispensing systems used therein in order to maintain them in a clean state. These solvent systems increase the complexity and cost of the apparatus and often, the solvent(s) used may have a detrimental effect on the dispensing apparatus over long-term use or on the bags into which the foam is dispensed.

U.S. Pat. No. 5,727,370 issued Mar. 17, 1998 and assigned to the assignee of the present invention describes an apparatus for producing foam cushions wherein two separate streams of reactive foam components are dispensed through separate nozzles into a flexible mixing chamber that is formed by two opposing panels of a plastic web that forms the exterior surface of the final foam cushion. In this apparatus, a solvent-free system is provided by directing the two streams of reactive foam components to an area between two opposing walls of a continuous plastic bag. Two separate tubes convey and direct the foam components at each other. Although effective, this apparatus utilizes ordinary nozzles on the ends of its dispensing tubes and it has been discovered that one of the two foam components does not always fully mix with the other of the two foam components.

The present invention is directed to an apparatus and methods for producing foam cushions which overcomes these disadvantages and which promotes more efficient mixing of the two reactive components.

SUMMARY OF THE INVENTION

In an apparatus according to the present invention, a solvent-free foam cushion making apparatus is provided with a foam dispensing assembly having two foam dispensing nozzles oriented so that foam components discharged therefrom intersect each other. One of the dispensing nozzles is provided with a diverter member that diverts, or deflects, a substantial amount of the foam component dispensed thereby into the path of the other foam component dispensing nozzle.

In another principal aspect of the present invention and as exemplified in one embodiment of the invention, the diverter has two distinct portions, one of which includes a first projecting portion that is aligned with the one foam component dispensing nozzle. A second projecting portion extends at an angle from the first projecting portion and extends into the paths of both of the dispensing nozzles so as to provide a reaction surface that interrupts the outermost portion of the flow of the one foam component to redirect it into the path of the other foam component.

In still another principal aspect of the present invention, a diverter assembly is provided having a body portion in the form of a hollow jacket that extends over the dispensing nozzle of the one foam component. A diverter member in the form of a bent rod extends out from the jacket portion along its associated dispensing nozzle. The jacket portion may be slid along the dispensing nozzle to locate the diverter rod at the most appropriate point of intersection with the one foam component fluid stream.

These and other objects, features, and advantages of the present invention will be clearly understood through a consideration of the following detailed description wherein like reference numerals refer to like parts.

BRIEF DESCRIPTION OF THE DRAWINGS

In the course of this detailed description, reference will be made frequently to the following drawings in which:

FIG. 1 is a perspective view of a foam cushion-making apparatus which incorporates a foam component diverter assembly constructed in accordance with the principles of the present invention;

FIG. 2 is a sectional view of the apparatus of FIG. 1 taken along lines 2—2 thereof;

FIG. 3 is a perspective view of the apparatus of FIG. 1 with its cover removed for clarity;

FIG. 4 is a sectional view of the apparatus of FIG. 2 taken along lines 4—4 thereof;

FIG. 5 is a sectional view of the apparatus of FIG. 2 taken along lines 5—5 thereof;

FIG. 6 is an elevational view of a nozzle assembly suitable for use in the apparatus of FIG. 1 and incorporating a diverter assembly constructed in accordance with the principles of the present invention;

FIG. 7 is an enlarged detail view of the diverter assembly of FIG. 6;

FIG. 8 is a view of the diverter assembly of FIG. 7 taken along lines 8—8 thereof;

FIG. 9 is a view of the diverter assembly of FIG. 7 taken along lines 9—9 thereof;

FIG. 10 is a schematic view of a prior art nozzle end of a nozzle assembly used in a known foam cushion-making apparatus; and, FIG. 11 is a schematic view of the nozzle end of the nozzle assembly of FIG. 6, illustrating the diversion of one of the reactive foam component streams.

DETAILED DESCRIPTION OF THE PREFERRED EMBODIMENTS

Referring now to the drawings, and in particular, FIGS. 1–5, a foam cushion-making apparatus 50 utilizing a foam component diverter assembly constructed in accordance with the principles of the present invention is shown mounted on an upstanding support 52 which includes a vertical stanchion 54 rising upwardly from a multi-leg base 56. The specific structure and details of most of this apparatus is found in U.S. Pat. No. 5,727,370, issued Mar. 17, 1998 and owned by the assignee of the present invention. The disclosure of this patent is incorporated herein by reference.

The stanchion 54 supports an apparatus frame 58, which in turn supports the various functional components of the apparatus 50 within an exterior protective housing 60. The apparatus 50 is useful in producing protective foam cushions 62 in which a mass of expandable foam 64, such as a urethane or polyurethane foam, is enclosed within an outer plastic film 66 which takes the form of an envelope or bag 68.

As shown in detail in FIGS. 1 & 5, the outer bag 68 which envelopes the foam cushion 62 may take a rectangular or square configuration. The plastic film 66 used for the bag 68 is folded upon itself at a general centerline 69 thereof to define a partial envelope in which two opposing panels 70, 71 of the plastic film 66 confront each other. When produced by apparatus 50 of the present invention, the foldline 69 of the bag 68 occurs along the length of the bag 68 at one marginal edge 72 thereof, The other lengthwise marginal edge 73 is provided with an edge seal 74, while the leading and trailing edges 76, 77 (which extend transversely along the width of the bag) are sealed when the bag is cut from the plastic film 66 which is supplied to the apparatus 50 from a film supply roll 78 rotatably mounted on the lower portion 59 of the frame 58 underneath the housing 60 and containing a continuous web 80 of film 66.

Turning now to FIG. 3, the film 66 is supplied to the apparatus 50 as a continuous web 80 and passes over a film guide roller 82 rotatably mounted within the frame 58 and into engagement with a film driving means 85 which drivingly engages the film 66 and advances it through the apparatus 50. A foam dispensing assembly 86, is mounted within the housing 60 adjacent the film driving means 85 so that it is interposed between the opposing film panels 70, 71. (FIG. 5.) The apparatus 50 further includes means for sealing together the open edges 73, 76 & 77 of the plastic film 66, preferably in the form of a edge seal assembly 88 and a crosscut seal assembly 90, which respectively seal the open marginal edges 73 and transverse edges 76, 77 of the film 66 as it advances through the apparatus 50.

As illustrated best in FIGS. 4 & 5, the film driving means 85 includes a pair of elongated, circular film driving members 92, 93 which extend between the sidewalls 61 of the apparatus housing 60. The film driving members 92, 93 include a driving member 92 and a driven member 93 that are driven by an electric motor 96 by way of gears 98 mounted on respective shafts of the film driving members 92, 93. The driving and driven members 92, 93 are driven in counter-rotation. The film driving members 92, 93 preferably take the form of pliable rollers, and most preferably brush rollers. The film driving members 92, 93 assist in the mixing of the reactive foam components and also ensure alignment and coplanarity of the opposing film panels 70, 71 of the film web 80 as it passes through the film driving means 85.

The foam dispensing assembly 86 used in the apparatus 50 takes the form of a foam dispensing gun 108 that serves to supply two streams 110, 111 of foam reactive components, also known as foam precursors, to the interior space 75 of the film web 80 between the two opposing film panels 70, 71 thereof. These foam reactive components are often referred to in the art as "A" and "B" foam components. The foam dispensing gun 108 includes two separate foam component supply tubes 112, 114 that are spaced apart from each other and held in place by one or more spacers 116.

The foam dispensing gun 108 includes a gun block 109 which contains two valves (not shown) which control the flow of foam components which enter the gun 108 under pressure from a pressurized supply of same (not shown). The gun block 109 may also include in-line heaters to heat the reactive foam component streams 110, 111 to prevent any cold shot from occurring which affects the chemistry which might result in less than optimally mixed and reacted foam components.

The foam dispensing gun 108 may further include a vacuum tube 120 which leads to a vacuum sensing block that is connected to a source of negative air pressure (not shown) and draws a slight constant vacuum on the two opposing film panels 70, 71 by way of two vacuum ports 124, 125. This vacuum draws the film panels 70, 71 passing over the foam dispensing gun 108 into contact with the vacuum ports 124, 125 and thereby provides a means for detecting the presence of the film web 80 in proximity to the loan dispensing gun nozzles 116, 118. When the negative air pressure is maintained such as when the plastic film web 80 is passing over the gun 108 and its vacuum ports 124, 125, a signal is sent to a programmable logic controller (PLC) which in turn sends a signal to the foam dispensing gun 108 to actuate the foam dispensing valves 126, 128 of the gun to maintain it in a "firing" state where it dispenses the two streams of the reactive foam components 110, 111 into the interior space 75 between the opposing film panels 70, 71. When either of the vacuum ports 124, 125 draws a positive pressure such as will occur when the plastic supply roll 78 is exhausted or if a tear should occur in the bag film 66, a signal is sent to the PLC which closes the gun valves 126, 128. This condition also occurs when the gun 108 is tilted out of its operational position above the apparatus 50. This system thus prevents injection of foam components into the nip 130 of the rollers 92, 93 unless a whole film 66 is present to provide a mixing chamber 132.

The foam dispensing assembly 86 may also includes a film engagement member, in the form of a spacer 119 which is positioned on the outboard edge of the one foam component supply tube 112. This spacer 119 engages the foldline or centerline 69 of the plastic film 66. This spacer 119 assists in aligning the free film edges 73 together and spaces the gun nozzles 116, 118 and point of foam injection from the centerline of the film 66.

As mentioned above, the present invention does not rely upon an in-line mixing chamber in place within the foam dispensing gun 108, but rather, the nozzles 116, 118 of the gun 108 extend into the film driving means 85, more specifically, into the nip 130 which occurs between the driving members 92, 93, which may be brush rollers.

As shown in FIGS. 4 & 5, the nozzles 116, 118 are positioned approximately at the centerline C of the rollers 92, 93. When the nozzles 116, 118 are positioned between the rollers 92, 93, it has been found that the foam reactive components effectively mix together and react to form an expandable foam. The mixing of these two foam components occurs in what may be characterized as a "flexible" mixing chamber 132 that is defined in part by the opposing film panels 70, 71 and particularly the interior surfaces thereof. The rollers 92, 93 assist in the mixing in that they exert pressure on the film panels 70, 71, that define the walls of the mixing chamber 132. The rollers 92, 93 therefore not only facilitate the mixing of the foam components, but also provide support for the film panels 70, 71 during expansion of the foam mass 64 during the initial reaction phase of the foam components 110, 111.

It is believed that the mixing occurs primarily at the centerline C of the nip 130 where the two rollers 92, 93 meet and press against each other, and below it. The pressure which the two rollers 92, 93 exert on the film panels 70, 71 is greatest at the nip 130, and in particular at the centerline C thereof.

The foam component supply tubes 112, 114 extend for the length of the film driving means 85 to a point near the folded centerline 69 of the film 66 and then extend downward toward the film driving means 85. The supply tubes each terminate in foam dispensing nozzles 116 & 118. The nozzles 116, 118 are preferably replaceable and may each include a hollow passage terminating in an orifice. The other ends of the nozzles may be threaded, as at 127, to provide an aspect of interchangeability and quick replaceablility.

Figures 10, 11:
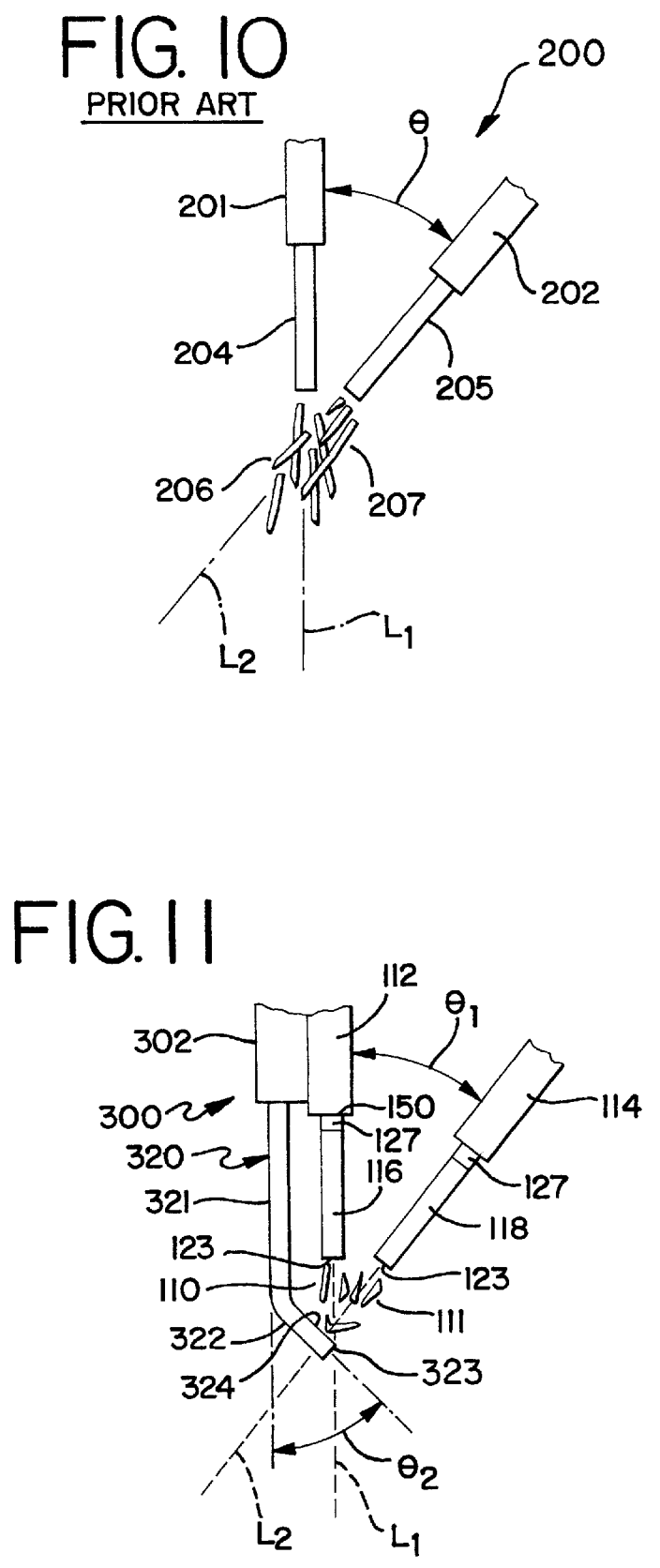

Although such an arrangement works well in the production of foam cushions, it has been discovered that a portion of one of the reactive foam components, typically that of the "A" reactive component, does not always fully mix with its counterpart "B" reactive component. FIG. 10 schematically illustrates a arrangement of a known foam dispensing assembly 200 disclosed in the aforesaid U.S. Pat. No. 5,727,370. This foam dispensing assembly 200 includes two foam supply tubes 201, 202, one of which 201 extends vertically while the other foam component supply tube 202 extends at an angle thereto so that imaginary lines drawn along the longitudinal axes $L_1$, $L_2$ (FIG. 10) of the respective associated dispensing nozzles 204, 205 intersect together so that the two streams 206, 207 exiting therefrom contact each other after they exit the dispensing nozzles 204, 205.

Turning now to FIGS. 6–9 and in particular, FIG. 6, the present invention includes a diverter assembly 300 that introduces a reaction surface into the path of one of the streams 110 of the reactive foam components, and preferably the "A" foam component. The diverter assembly 300, as illustrated, includes a housing, or jacket portion 302 that is adapted to mate with and overlie a portions of the desired dispensing nozzle 116.

In this regard and as illustrated in FIGS. 7–9, the housing 302 may have a generally U-shaped configuration with a hollow interior portion 304 extending in the form of a slot between an inbound edge 306 and an outbound edge 307 of the housing 302. The hollow interior portion 304 includes a hollow bore portion 308 that receives part of the foam component supply tube 112 and part of its associated dispensing nozzle 116. This bore 308 may include an interior rim, or shoulder 310 that may be placed against the edge 150 of the dispensing tube 112 where it joins its dispensing nozzle 116 in order to facilitate the desired positioning of the director assembly 300 on the dispensing assembly 108.

The housing 302 may include near its upper edge 312, a pair of contact faces 314 that will preferably abut and contact the opposing surfaces of the spacer that supports the vacuum port 124. The interior slot 304 permits the diverter assembly 300 to be easily added to existing foam cushion-making apparatus without the need for disassembly of either the apparatus or of the foam injection assembly 108. The housing 302 of the diverter assembly 300 may include a tapped portion 315 and an associated fastener 316 so that it may be firmly clamped, or secured to the injection head of the dispensing assembly 108.

Importantly, the diverter assembly 300 includes a reaction surface that is interposed in the path of one of the foam component streams 110. In the preferred embodiment illustrated, an elongated reaction member 320 extends out from a lower edge 317 of the diverter assembly 300 in a direction preferably parallel to the particular dispensing nozzle 116. The reaction member 320 has a first extent 321 that follows this path and a second extend 322 that is angled with respect to the first extent 321. As illustrated best in FIG. 11, the second extend 322 extends at an angle $\theta_2$ and it terminates in a tip end 323 that ends at approximately the intersection of the two foam component dispensing streams, $L_1$ and $L_2$.

Due to this change of direction, the second extent 322 serves as a reaction surface 324 that is interposed in the reactive foam component stream 110 and which serves to redirect at least the outboard portion of the flow stream 110 toward the other foam component stream 111. By virtue of this redirection, more efficient mixing of the two foam components is promoted. The reaction surface 324 may be round with a diameter of about 0.125 inches and positioned at an angle $\theta_2$ equal to about 15°, of which the angle $\theta_1$ is a multiple, roughly three times greater. The reaction surface 324 may be modified along its tip end to display a flat, curved or any desirable profile.

Therefore, it will be understood that the present invention advantageously provides a foam-in-place apparatus that promotes more efficient mixing of the two reactive foam components and which is of a structure that permits easy installation on an existing foam cushion-making apparatus as a simple retrofit process.

While the preferred embodiments of the invention have been shown and described, it will be obvious to those skilled in the art that changes and modifications may be made therein without departing from the spirit of the invention, the scope of which is defined by the appended claims.

I claim:

1. In an apparatus for successively forming foam cushions, wherein each foam cushion includes two opposing flexible panels connected together along perimeters of said flexible panels to form a foam cushion bag, and the opposing flexible panels defining an interior space therebetween which is filled with a cushioning foam, and wherein the apparatus includes a supply of flexible film having a continuous web of film defining two opposing film panels disposed in face-to-face contact, a foam dispensing assembly interposed in a travel path of said film web for dispensing separate amounts of first and second foam components into said travel path, the foam dispensing assembly including separate first and second foam-dispensing nozzles that respectively dispense said first and second foam components into said travel path, means for driving said film web along said travel path through said apparatus, and said foam dispensing assembly including first and second foam-dispensing nozzles extending between said film web opposing panels and said foam-dispensing assembly further including first and second means for selectively supplying said first and second foam components respectively to said first and second nozzles, the improvement comprising:

a reaction member associated with said first foam dispensing nozzle, the reaction member having a reaction surface that extends alongside said first foam-dispensing nozzle and is interposed into a path of said first foam-dispensing nozzle to thereby divert at least a portion of said first foam component dispensed by said first foam-dispensing nozzle into a path of said second foam-dispensing nozzle, thereby promoting more efficient mixing of said first and second foam components.

2. The apparatus of claim 1, wherein said nozzles each have foam dispensing openings which are positioned between a pair of driving and driven rollers at a centerline of said driving and driven rollers and said reaction member extends into said driving and driven roller centerline.

3. The apparatus of claim 1, wherein said foam dispensing assembly includes a supply of first and second reactive components which, when mixed together, react to form said foam, said first and second foam-dispensing nozzles being respectively interconnected to said first and second reactive component supplies.

4. The apparatus of claim 1, wherein said first and second foam-dispensing assembly nozzles have foam dispensing openings which are positioned downstream of a centerline of said film web driving means.

5. The apparatus of claim 1, wherein said first and second foam-dispensing assembly two nozzles are aligned together so that two imaginary lines drawn along respective longitudinal axes of said two nozzles intersect.

6. The apparatus of claim 5, wherein said foam dispensing assembly two nozzles are aligned apart at approximately a 45° angle from each other.

7. The apparatus of claim 1, wherein said reaction member includes a housing portion having a hollow interior in which a portion of said first foam-dispensing nozzle is received such that said reaction member extends alongside said first foam-dispensing nozzle.

8. The apparatus of claim 7, wherein said reaction member has a first extent that extends parallel to said first foam-dispensing nozzle path and a second extent that extends at an angle to said first foam-dispensing nozzle path.

9. The apparatus of claim 1, wherein said reaction member includes first and second extents, the first extent extending alongside said first foam-dispensing nozzle and said second extent extending into and intersecting with said second foam-dispensing nozzle path.

10. The apparatus of claim 1, wherein said reaction member includes a round bar having an angled tip end that extends beneath said first foam-dispensing nozzle and into the path of said first foam-dispensing nozzle.

11. The apparatus of claim 5, wherein said reaction member includes a tip end portion that extends to the point where said two imaginary lines intersect.

12. An apparatus for successively forming foam cushions, wherein each foam cushion includes two opposing flexible panels connected together along perimeters of said flexible panels to form a bag, the opposing flexible panels defining an interior space therebetween which is filled with a cushioning foam formed from two different reactive foam components, the apparatus comprising:

a supply of flexible film, the film supply including a continuous web of film defining two opposing film panels disposed in face-to-face contact, the continuous web of film having a first edge extending lengthwise along one side thereof;

a foam dispensing assembly interposed in a travel path of said film web, the foam dispensing assembly including two separate foam dispensing nozzles that are aligned together so that two imaginary lines drawn along respective longitudinal axes of said two nozzles intersect said two foam-dispensing nozzles dispensing said two reactive foam components into said travel path;

means for driving said film web along said travel path through said apparatus;

a flexible mixing chamber in which said two foam components dispensed from said foam dispensing assembly are mixed together to form an expandable foam, the flexible mixing chamber being disposed in said film web travel path proximate to said foam dispensing assembly, said flexible mixing chamber being formed in part by said opposing film panels, said opposing film panels defining walls of said flexible foam mixing chamber within said apparatus when said opposing film panels are disposed within said apparatus and defining walls of said foam cushion bag when said opposing film panels are exterior of said apparatus; and, a diverter associated with one of the said two foam dispensing nozzles and intersecting an imaginary line drawn along said longitudinal axis of said one foam-dispensing nozzle, thereby promoting more efficient mixing of said two reactive foam components.

* * * * *